United States Patent
Hammer et al.

(10) Patent No.: US 7,195,542 B2
(45) Date of Patent: Mar. 27, 2007

(54) PROCESS, APPARATUS AND SLURRY FOR WIRE SAWING

(75) Inventors: Ralf Hammer, Freiberg (DE); André Kleinwechter, Freiberg (DE); Sylvia Müller, Freiberg (DE); Ralf Gruszynsky, Brand-Erbisdorf (DE)

(73) Assignee: Freiberger Compound Materials GmbH, Freiberg (DE)

( * ) Notice: Subject to any disclaimer, the term of this patent is extended or adjusted under 35 U.S.C. 154(b) by 0 days.

(21) Appl. No.: 11/484,723

(22) Filed: Jul. 12, 2006

(65) Prior Publication Data

US 2007/0049173 A1 Mar. 1, 2007

Related U.S. Application Data

(60) Provisional application No. 60/719,185, filed on Sep. 22, 2005.

(30) Foreign Application Priority Data

Aug. 25, 2005 (DE) .................. 10 2005 040 343

(51) Int. Cl.
*B28D 1/08* (2006.01)
(52) U.S. Cl. .................. 451/8; 125/16.02; 125/21; 83/651.1
(58) Field of Classification Search .......... 451/5, 451/8; 125/16.01, 16.02, 12, 21, 35; 83/651.1, 83/307.1; 51/307, 308, 309
See application file for complete search history.

(56) References Cited

U.S. PATENT DOCUMENTS

| | | | |
|---|---|---|---|
| 4,812,428 A * | 3/1989 | Kohut | 501/148 |
| 5,701,950 A * | 12/1997 | Imamura et al. | 165/222 |
| 5,947,102 A | 9/1999 | Knepprath et al. | |
| 6,422,067 B1 | 7/2002 | Oishi et al. | |
| 6,923,171 B2 | 8/2005 | Hammer et al. | |
| 2004/0118338 A1 | 6/2004 | Hammer et al. | |

FOREIGN PATENT DOCUMENTS

| | | |
|---|---|---|
| CH | 691 039 A5 | 4/2001 |
| DE | 199 38 339 A1 | 3/2001 |
| DE | 100 52 154 A1 | 5/2002 |
| DE | 101 28 630 A1 | 1/2003 |
| EP | 0 686 684 A1 | 12/1995 |
| EP | 0 837 115 B1 | 4/1998 |

* cited by examiner

*Primary Examiner*—Jacob K. Ackun, Jr.
(74) *Attorney, Agent, or Firm*—Foley & Lardner LLP

(57) ABSTRACT

A wire saw (1; 100) for cutting a workpiece includes a device (21, 22, 24, 27) for setting, controlling and/or maintaining a predetermined or desired water content in at least part of the gaseous medium that contacts the slurry. With the wire saw according to the invention and the process carried out using this wire saw, it is possible to achieve consistently good surface properties of the resulting wafers over a prolonged period of use of a slurry.

25 Claims, 14 Drawing Sheets

PROCESS, APPARATUS AND SLURRY FOR WIRE SAWING

CROSS-REFERENCE TO RELATED PATENT APPLICATIONS

The right of priority is claimed under 35 U.S.C. § 119(a) based on German Patent Application No. 10 2005 040 343.3, filed on Aug. 25, 2005, the entire contents of which, including the specification, drawings, claims and abstract, are incorporated herein by reference. The benefit is also hereby claimed under 35 U.S.C. § 119(e) of the filing date based on U.S. Provisional Patent Application 60/719,185, filed Sep. 22, 2005, the entire contents of which, including the specification, drawings, claims and abstract, are incorporated herein by reference.

BACKGROUND OF THE INVENTION

The present invention relates to a process, an apparatus and a slurry for wire sawing, for example, of crystalline material to form semiconductor wafers.

EP 0 837 115 B1 discloses a process for cutting off wafers from a crystal made from hard, brittle material using a wire saw and an agent in the form of a suspension. The agent substantially comprises a non-aqueous liquid, in which hard-material particles with an abrasive action are dispersed. The non-aqueous liquid is selected from a group of compounds consisting of polyglycols with a molecular weight of from 75 to 150 and mixtures thereof containing at most up to 5% by weight of water, based on the weight of the suspension. The viscosity of the liquid is preferably 50–800 mPas at 20° C. The process has the drawback that the sawing suspension which is used has to be replaced at relatively frequent intervals, and the properties of the slurry may change in an uncontrolled way during wire sawing.

CH 691 039 A5 discloses the use of a slurry which consists of a mixture of polyols, at least one of which is a polyglycol, in wire sawing. The mixture of polyols can be selected in such a way that the slurry has a predetermined viscosity. The document also states that the mixture of polyols may contain water.

EP 0 686 684 A1 discloses the use of a sawing suspension which consists of an abrasive in liquid aqueous phase. The sawing suspension contains a thickener, such as, for example, water-soluble polymers. The viscosity of the sawing suspension is between 10 and 1000 mPas at a shear rate of $10\ s^{-1}$.

DE 199 38 339 A1 discloses a sawing suspension for use in a wire saw, which contains at least one member selected from the group consisting of mineral oils and glycols. At least one further additive selected from the group of the polysiloxanes is also used.

U.S. Pat. No. 6,422,067 describes how a slurry which is suitable for wire sawing has a viscosity of approximately 400–700 mPas at a shear rate of approximately $2\ s^{-1}$ and of 50–300 mPas at a shear rate of approximately $380\ s^{-1}$.

A wire sawing process which is known to the assignee of this application (not prior art; hereinafter referred to as a "Comparison") uses a glycol-based slurry which contains a glycol-based carrier liquid and SiC grains (SiC Fujimi GC 1000) as hard material with an abrasive action. The water content of the slurry remains constant during the wire sawing.

FIGS. 11 and 12 illustrate the changes in a glycol-based slurry according to the Comparison, comprising the carrier substance known by the product name Pluriol E 200, as the duration of use for the wire sawing of GaAs crystals increases. In this case, the water content of the slurry remains approximately constant at (12±2) g/l. The dynamic viscosity of the slurry at a shear rate of $20.4\ s^{-1}$ is plotted against the GaAs content of the slurry in the upper part of FIG. 11. An increasing GaAs content corresponds to an increasing duration of use of the slurry for the wire sawing of GaAs. The density of the slurry is plotted against the GaAs content in the lower part of FIG. 11. The dynamic viscosity and the density of the slurry increase approximately linearly with the GaAs content. The dynamic viscosity of the slurry for various GaAs contents for the Comparison is plotted against the shear rate in FIG. 12. The slurry in this case has a non-Newtonian behavior for each of the GaAs contents shown.

FIG. 13 shows the properties of a slurry according to the Comparison which contains a glycol-based carrier substance known by the product name Betronol MF V 1016 and has an approximately constant water content of (18±5) g/l. The figure plots the dynamic viscosity of the slurry for various GaAs contents against the shear rate. As above, the dynamic viscosity increases with an increasing GaAs content, i.e., as the duration of use of the slurry increases. At the same time, the slurry has a non-Newtonian behavior for each GaAs content.

The Comparison process known to the assignee of this application has the drawback that the changes in the properties of the slurry with increasing duration of use simultaneously cause a deterioration in the quality of the GaAs wafers produced in this way. In particular, structures which reveal the orientation of the wire relative to the GaAs wafers during sawing are visible to the naked eye on the surface of the GaAs wafers after wire sawing. These structures mean that the back surface, even of wafers which have undergone single-side polishing, has to be re-machined, for example, by surface lapping, before they can be delivered to component manufacturers or prior to the epitaxial production of components.

SUMMARY OF THE INVENTION

It is one object of the present invention to provide an improved apparatus for wire sawing which can be used to achieve an improved quality of the wafers that are cut from a workpiece.

A further object of the present invention is to provide an improved process for wire sawing which can increase the duration of use of the slurry, without the longer duration of use having an adverse effect on the properties of the wafers which are cut.

It is also an object of the invention to provide an improved slurry for wire sawing.

In accomplishing these and other objects, there has been provided according to one aspect of the present invention a wire saw for cutting a workpiece, comprising: a wire; an applicator device for applying a slurry to the wire; and a device for establishing a predetermined water content in at least part of a gaseous medium coming into contact with the slurry. The term "establishing" is used broadly to include setting, controlling, regulating and/or maintaining a desired water content.

In accordance with another aspect of the invention, there is provided a process for cutting a workpiece, comprising: wire sawing the workpiece with a wire saw; applying a water-containing slurry to the wire during sawing; and establishing a predetermined water content of at least part of a gaseous medium coming into contact with the slurry during at least one stage of the process.

In accordance with another aspect of the invention, there is provided a slurry for use in a wire saw, the slurry having a dynamic viscosity of less than approximately 220 mPas, and wherein the dynamic viscosity in the shear rate range from $2\ s^{-1}$ to $34\ s^{-1}$ is substantially independent of the shear rate.

Still further according to another aspect of the invention, there is provided a process for preconditioning a slurry that comprises a hygroscopic carrier substance, comprising: first preparing the slurry with a starting viscosity predetermined at a shear rate of $20.4\ s^{-1}$, and preconditioning the slurry, by controlling the water content of at least part of a gaseous medium coming into contact with the slurry, for a period of time so that the slurry has a preconditioned viscosity of approximately 220 mPas or less at a shear rate of $20.4\ s^{-1}$, wherein the preconditioned viscosity differs from the starting viscosity. Also provided is a preconditioned slurry made by this process.

Further objects, features advantages and expedient refinements of the invention will emerge from the description of exemplary embodiments, with reference to the accompanying figures of drawings.

DETAILED DESCRIPTION OF THE PREFERRED EMBODIMENTS

One advantage of using of the wire saw according to the invention is that, by controlling the water content of at least part of the gaseous medium which surrounds the slurry, it is possible to set and/or control the water content of the slurry and therefore the rheological properties and viscosity of the slurry in a targeted way.

In one preferred embodiment, the water content of the gaseous medium surrounding the slurry is controlled to a constant value, so that water is taken up into the slurry in a targeted or controlled way. This has the advantage that the viscosity can be made to drop, despite the increasing density of the slurry, and to reach a stable value. This allows the wafers produced in this way to be of a high quality which remains constant over the duration of time that the slurry is used.

According to a preferred mode of operation, with a controlled constant water content in the gaseous medium in the cutting space of the wire saw in a range from $7–17\ g/m^3$, preferably from $11–15\ g/m^3$, it is possible to achieve constant results with regard to the quality of the wafers produced using the wire saw, and frequent replacement of the slurry is not necessary.

The preferred use of a slurry with a viscosity of less than 220 mPas, more preferably in the range from 170–200 mPas, independently of the shear rate in a range from $2\ s^{-1}$ to $34\ s^{-1}$, leads to a structure-free surface of the sawn wafers and to a high long-term stability of the cutting process. Controlling the viscosity of the slurry by means of the water content of the air stream in the wire saw enables a long duration of use for the slurry, and the Ga balance (recovery of Ga from the used slurry by unit volume) is improved compared to other processes.

The invention also has the advantage that higher feed rates for cutting are possible, while still achieving a high quality of wafer.

The apparatus and process according to the invention allow the use of simple, inexpensive polyethylene glycol, without any added thickener.

Controlling the water content of the air in the wire saw has the further advantage, over the direct addition of water to the slurry, that the water content of the slurry can be altered in both directions, i.e., can be increased and/or decreased.

The invention has the further advantage that it is possible to ensure a constant transportation of slurry into the cutting gap, despite varying properties of the wire and varying densities of the slurry. The invention enables a process in which it is not necessary to frequently replace the wire, in view of the fact that the viscosity of the slurry can be set to a level which is optimum for the wear state of the wire.

In addition, a slurry which has been (pre)conditioned in accordance with the invention has the advantage that its properties can be controlled very well during cutting in the process according to the invention.

Figure 1:
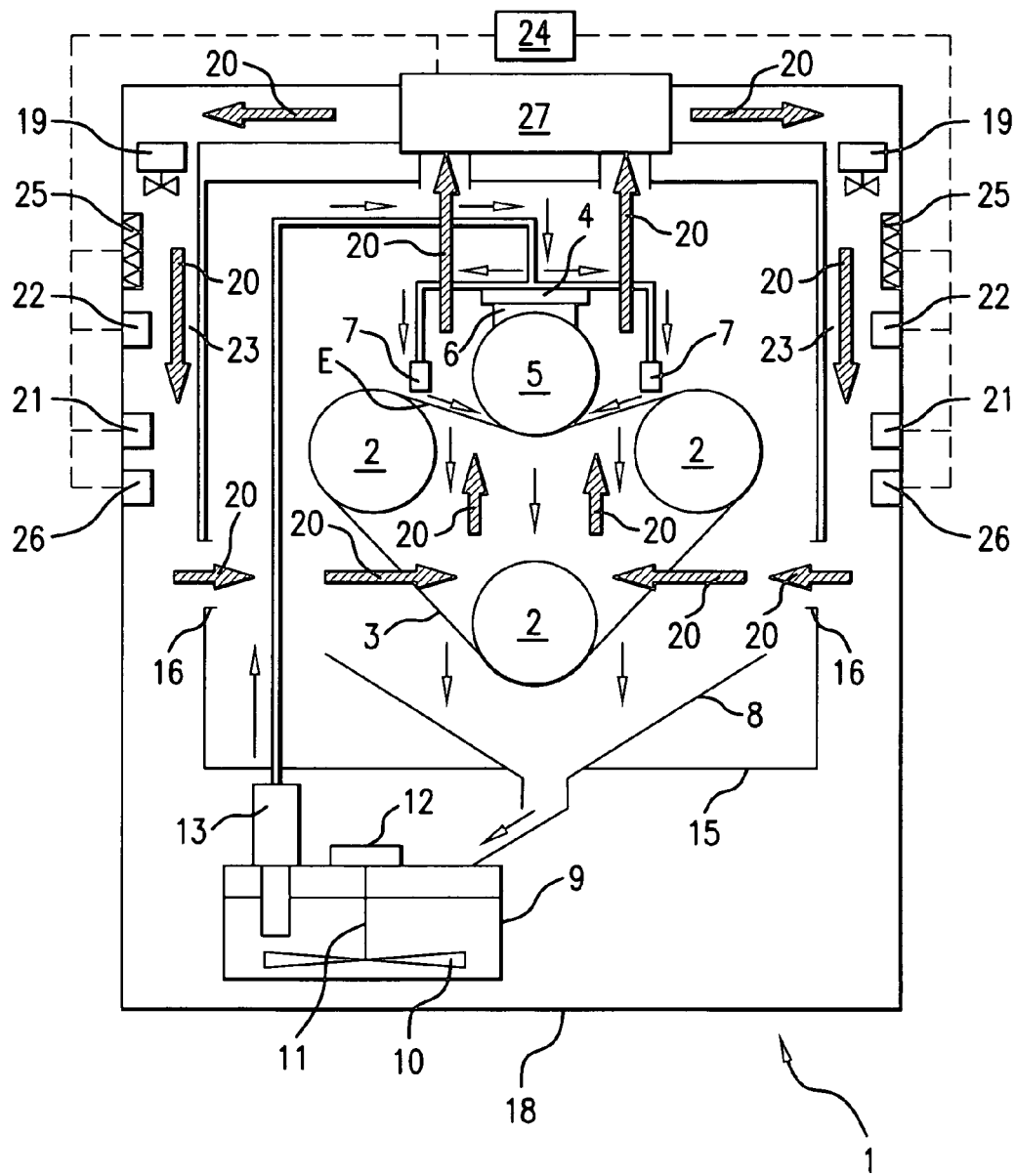
FIG. 1 is a schematic drawing showing a first exemplary embodiment of a wire saw according to the invention.

Turning now to the drawings, FIG. 1 illustrates a first exemplary embodiment of a wire saw 1 according to the invention.

The wire saw 1 has wire guide rolls 2 which have their axes arranged parallel to one another and around which a wire is multiply guided, so as to delimit a wire field E which is composed of parallel wire sections and is perpendicular to the plane of the drawing in FIG. 1. A feed device 4, to which a workpiece 5 can be secured using a saw cleat 6, is also provided. The feed device 4 can be used to move the workpiece 5 secured to it through the wire field E in a direction perpendicular to the wire field E. The wire guide rolls 2 are connected to a rotary apparatus (not shown in detail), which can rotate the wire guide rolls 2 in order to move the wire along its longitudinal axis.

Two slurry nozzles 7 are arranged above the wire plane for applying slurry to the wire field E. The slurry nozzles 7 are arranged in such a way that, respective slurry nozzles are located on the two opposite sides of the workpiece, in a direction along the wire sections which form the wire plane E.

Below the wire guide rolls 2 there is a funnel-shaped collection apparatus 8. At the lower end of the funnel-shaped collection apparatus 8 an outlet is located for recovering slurry that is collected using the collection apparatus 8 and passing it into a slurry tank 9. In the slurry tank 9, a stirrer 10 uniformly mixes the slurry. The stirrer 10 is connected via a shaft 11 to a motor 12 for driving the stirrer. A pump 13 pumps the slurry back out of the slurry tank via a supply line 14 to the slurry nozzles 7. The collection apparatus 8, the slurry tank 9, the pump 13 and the supply line 14 form a recirculation apparatus for the slurry, for circulating the slurry within the wire saw.

The cutting region of the wire saw, i.e., the region around the wire field E in which the workpiece is divided or cut when the wire saw is operating, is separated from the environment by an inner housing 15. Air inlet openings 16 are located in the housing 15, in the two opposite side walls below the wire plane E. On the top side above the wire plane E, i.e., on the side of the housing 15 remote from the collection apparatus, there are one or more air outlet openings 17. An outer housing 18, is arranged around the inner housing 15 and the slurry tank 9. The outer housing 18 seals the wire saw with respect to the environment in such a manner and to such a degree that the climate within the device can be controlled, i.e., the water content and the temperature of the air in the wire saw can be set independently of the environment outside the housing 18. Two air circulation passages 23 for guiding an air stream from the air outlet openings 17 back to the air inlet openings 16 are formed in the space between the outer housing 18 and the inner housing 15. The air circulation passages 23 are open in the direction toward the slurry tank 9.

Fans 19 for maintaining the circulation of an air stream in the direction indicated by the arrows 20 are arranged in the air circulation passages 23.

An air humidity sensor 21 is arranged in the air circulation passage 23 for measuring the water content of the air that emerges from the inner housing 15. Furthermore, an air humidifier 22 and an air dryer 27 are arranged in the air circulation passage 23. The air humidifier 22 and the air dryer 27 are connected to the air humidity sensor 21 via a control device 24. The control device 24, the air humidity sensor 21, the air dryer 27 and the air humidifier 22 form a control circuit for a closed-loop control system for controlling the water content of the circulating air stream to a predetermined or desired value.

Further, a heating device 25 and a temperature sensor 26, which are connected to one another via the control device 24, are also arranged in the air circulation passage 23. The control device 24, the temperature sensor 26 and the heating device form a closed-loop control circuit which can be used to control the temperature of the air stream to a predetermined or desired value.

When the wire saw 1 is operating, a workpiece 5 secured to the feed device 4 with the saw cleat 6, is moved through the wire field E in a direction perpendicular to the latter. The wire 3 is in this case moved by rotation of the wire guide rolls 2 in such a manner that the wire sections of the wire field E move along their longitudinal axis. During the cutting operation, the wire sections on one side of the workpiece move into the cutting gap, whereas the wire sections on the opposite side of the workpiece move out of the cutting gap. To carry out the cutting, the wire can be either moved synchronously always in the same direction or alternately in a reciprocating manner.

Figure 14:
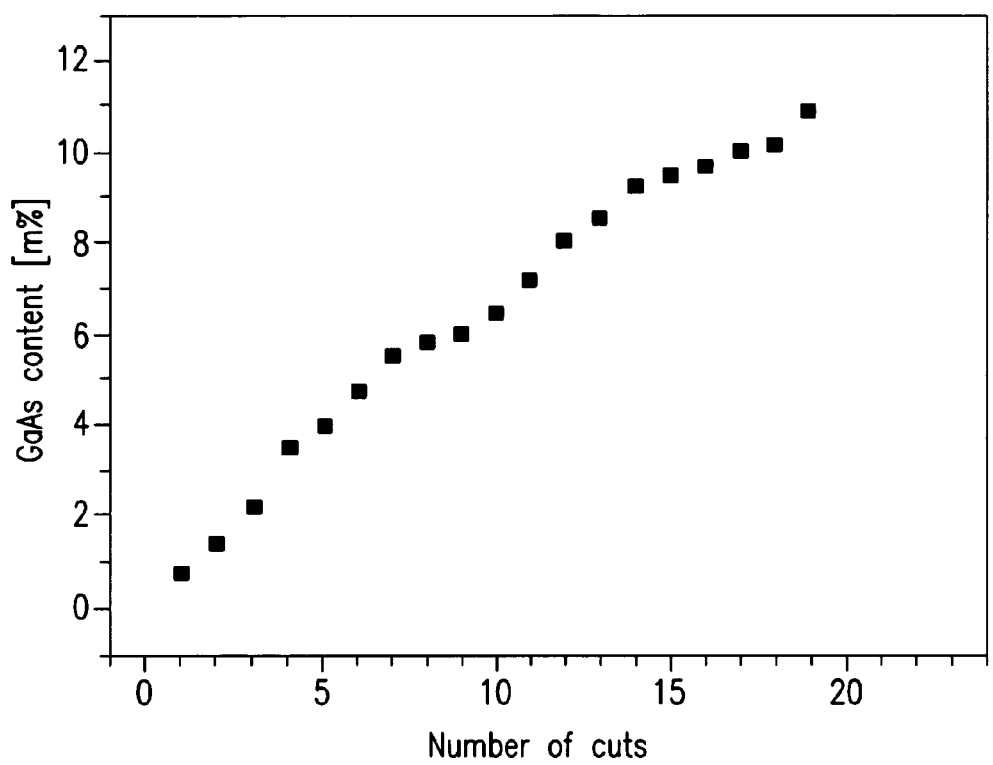
FIG. 14 is a graph showing a plot of the way in which the GaAs content of a slurry is dependent on the number of cuts carried out.

Slurry is applied to the wire sections of the wire field E through the slurry nozzle 7 on the side of the workpiece 5 on which the wire sections are moving into the cutting gap. The wire sections transport the slurry into the cutting gap. The slurry used contains a glycol-based carrier substance (e.g., exemplary preferred compositions contain polyethylene glycol bearing the product name "Pluriol E 200" produced by BASF AG or the glycol-based substance mixture "Betronol MF V 1016" produced by MKU Chemie GmbH) and a hard material with an abrasive action, such as SiC grains (e.g., SiC Fujimi GC 1000). Many other glycol-based carrier compositions and/or many other types of abrasive material can be used according to the invention. On account of the abrasive action of the SiC grains and of the removal of material when the wire moves with the slurry through the cutting gap, the workpiece wafers are removed by lapping (wire cutting lapping). In the process, the slurry picks up material which has been removed from the workpiece, so that the density of the slurry increases with increasing duration of use in the cutting process. This behavior of the slurry as the duration of the cutting process increases can be seen in the lower part of FIG. 2, in which the density of the slurry is plotted against the GaAs content. As can be seen from FIG. 14, the GaAs content of the slurry increases with the number of cuts, i.e., the number of GaAs single crystals which are cut, with the precise relationship between the number of cuts and the GaAs content of the slurry depending on the length and diameter of the GaAs single crystals which are cut. The number of wafers per GaAs single crystal cut is generally between 100 and 200 wafers. An increasing number of cuts at the same time means an increasing duration of use of the slurry. Therefore, an increase in the GaAs content corresponds to an advancing duration of use of the slurry.

The slurry which is used to cut the workpiece passes under the force of gravity via the collection apparatus 8 into the slurry tank 9. In the slurry tank 9, the slurry is homogeneously mixed by means of the stirrer 10, so that the slurry retains homogeneous properties. Then, the slurry is pumped back out of the slurry tank 9 through the supply line 14 to the slurry nozzles 7, by means of the pump 13. The slurry is once again applied through the slurry nozzles 7 to the wire sections in the wire plane E which are moving into the cutting gap. In this way, a circulation of the slurry is maintained within the wire saw.

The air within the wire saw is carried from the air outlet openings 17 to the air inlet openings 16 in the air circulation passage 23, with the aid of the fans. As a result and on account of the arrangement of the air inlet and air outlet openings 16, 17, the air within the wire saw is passed through the cutting space in the direction indicated by the arrows 20 in FIG. 1. As a result, a circulating air stream is maintained within the wire saw through the air circulation passage 23 and the cutting space in the interior of the inner housing 15. The water content of the circulating air is controlled using the air humidity sensor 21, the control device 24, the air dryer 27 and/or the air humidifier 22. At the same time, the temperature of the circulating air is controlled to any desired, predetermined value by the heating device 25, the temperature sensor 26 and the control device 24.

The values for the dynamic viscosity of the slurry which are given in the following description for workpiece cutting processes were taken using a Haake Viskotester 6L having a measurement adapter for small specimen quantities with a cylindrical geometry. The spindle 6L, a specimen volume of 10 ml and a measurement temperature of 24.5° C. were used. The water contents of the slurry given below were determined by Karl-Fischer titration. The Karl-Fischer titration is carried out after separating the solids content, i.e., the other contents measured and described in this application relate to the liquid portion of the slurry.

In a first embodiment of a process for cutting a workpiece, the water content of the air is controlled to a constant value.

The text which follows describes a specific exemplary configuration of the first embodiment of the process for cutting a workpiece. In the exemplary embodiment, GaAs single crystals with a diameter of 150 mm were cut at a feed rate of >2 mm/min. The water content of the air was controlled to a constant value of $(12\pm1)$ g/m$^3$, the temperature of the air stream within the wire saw was kept constant at $(23\pm1)°$ C., and the throughput of air within the cutting space was set to $(400\pm50)$ m$^3$/h. The air pressure in the wire saw was ambient pressure. Within the wire saw, the slurry circulated at a mass flow of $(6000\pm500)$ kg/h. During the cutting of a single crystal, the wire was moved synchronously, i.e., in a constant direction along the wire axis, at a velocity of 8–12 m/s.

The exemplary configuration of the first embodiment of the process makes use of the subject matter described in DE 100 52 154 A1; the entire content of which is hereby incorporated by reference. In particular, the angle ρ between a predetermined crystallographic direction in the cutting plane and the feed direction was selected in such a manner that forces which act on the wire of the wire saw, in a direction perpendicular to the cutting plane during the cutting operation, substantially compensate for one another.

Furthermore, in the exemplary embodiment described here, the single crystals were oriented in the wire saw using a method described in DE 101 28 630 A1 with the aid of an autocollimator. The entire contents of DE 101 28 630 are also incorporated herein by reference.

The slurry used was a suspension of "SiC Fujimi GC 1000" (produced by Fujimi) as an abrasive hard material in "Betronol MF V 1016" (produced by MKU Chemie GmbH) as a carrier substance. The slurry had a mass ratio between SiC and the carrier substance Betronol of $m_{SiC}/m_{Betronol}=0.8\pm0.2$. Before the first cutting operation, the slurry was prepared with a starting viscosity of approximately 300 mPas. The water content of the slurry was increased to approximately 60 g/l by preconditioning in accordance with the process described above, without any cutting of a GaAs single crystal.

Figure 2:
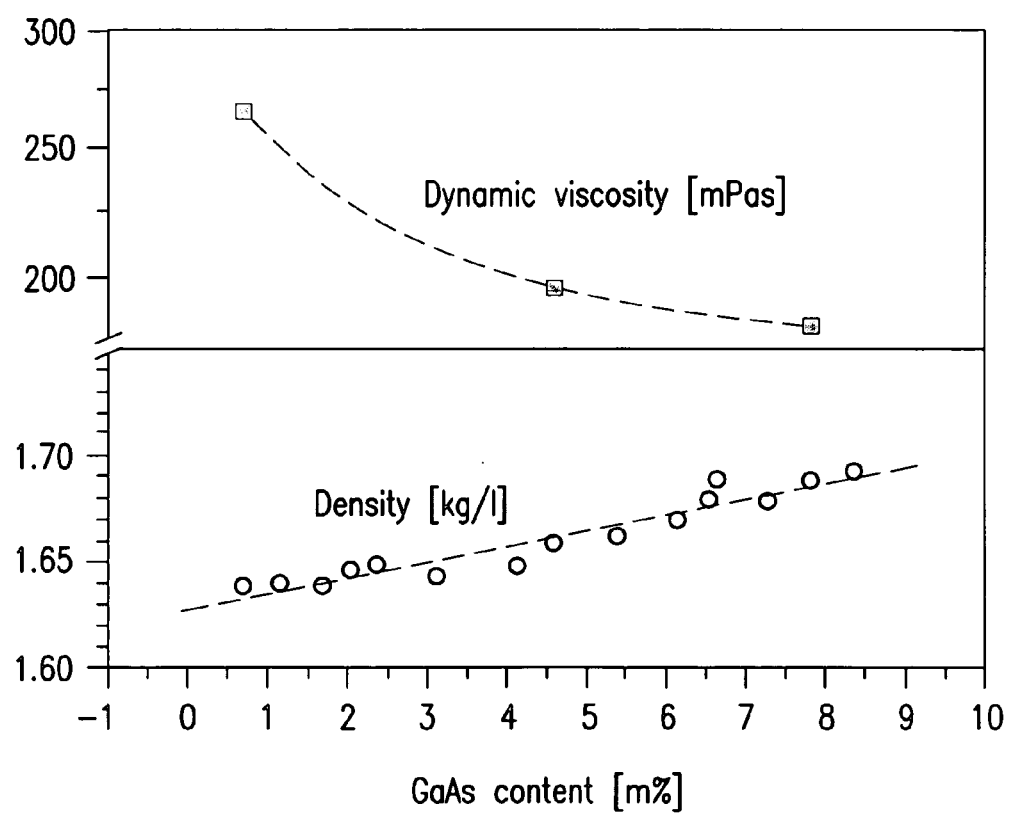
FIG. 2 is a graph showing a plot of the dynamic viscosity of a slurry at a shear rate of $20.4\ s^{-1}$ and also of the density of a slurry as a function of the GaAs content in a process according to a first embodiment.
Figure 3:
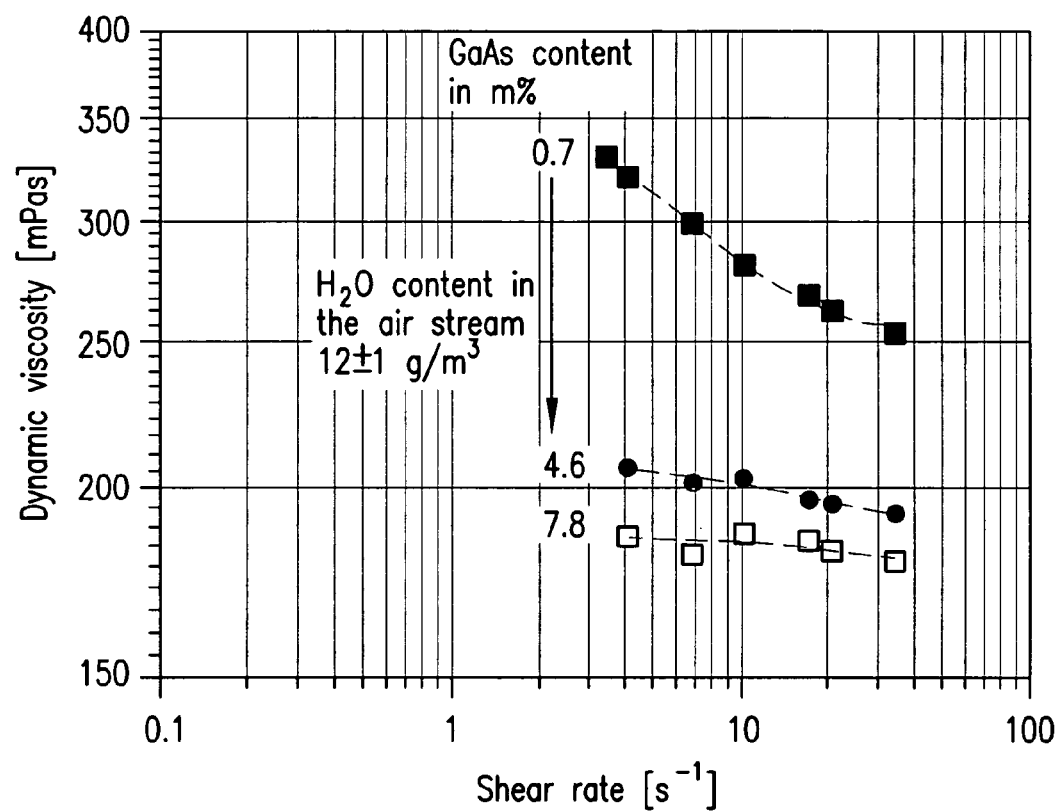
FIG. 3 is a graph showing a plot of the dynamic viscosity as a function of the shear rate for various GaAs contents of the slurry in a process according to the first embodiment, carried out using the wire saw shown in FIG. 1.
Figure 4:
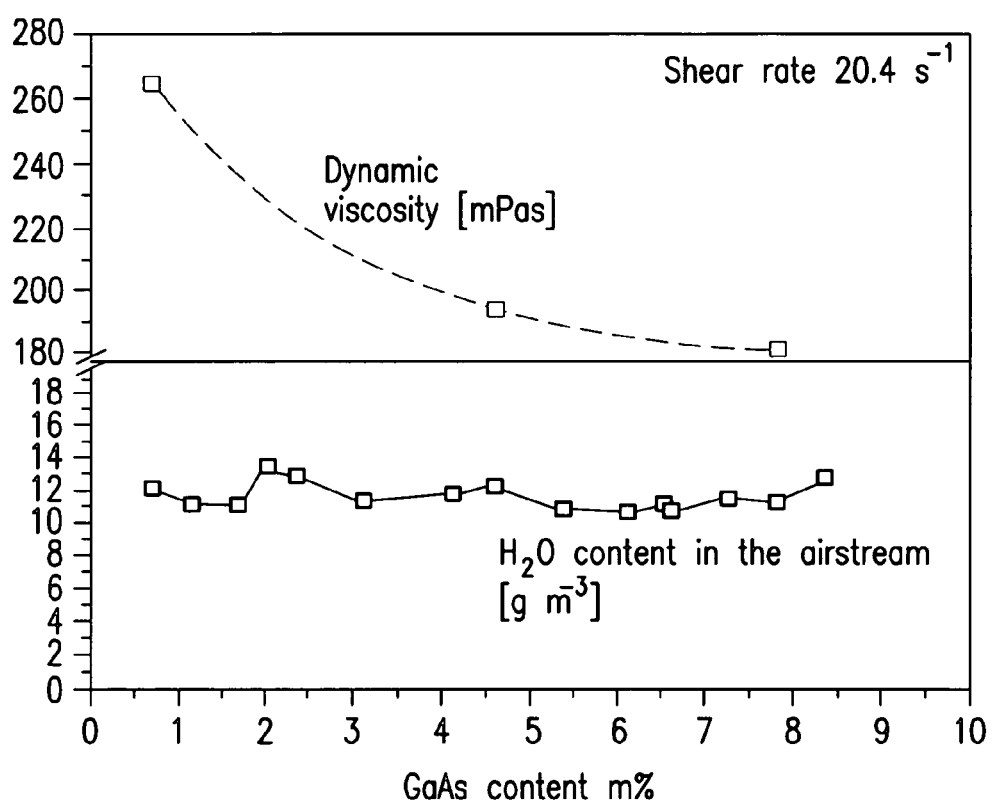
FIG. 4 is a graph showing a plot of the dynamic viscosity of the slurry at a shear rate of $20.4\ s^{-1}$ and also of the water content in the air stream, as a function of the GaAs content of the slurry, in a process according to the first embodiment.

FIGS. 2 to 4 show the properties of the slurry of the above-described exemplary embodiment with an increasing GaAs content, i.e., an increasing duration of use, of the slurry to cut wafers.

The dynamic viscosity and density of the slurry are plotted against the GaAs content in FIG. 2. Despite the increase in density, the dynamic viscosity of the slurry decreases as the duration of use progresses. As a result, it is possible to obtain uniform surface properties of the wafers cut from the workpiece.

FIG. 3 illustrates the dynamic viscosity of the slurry as a function of the shear rate for various GaAs contents. With an increasing GaAs content of the slurry, i.e., with an increasing duration of use of the slurry in the cutting process, the dynamic viscosity decreases continuously to a level of approximately 190 mPas at a GaAs content of 7.8% by mass. At the start of use in the cutting process, the slurry has a non-Newtonian behavior, i.e., the dynamic viscosity is very dependent on the shear rate, whereas as the duration of use progresses, the dynamic viscosity of the slurry becomes less and less dependent on the shear rate. At a GaAs content of 7.8% by mass, the rheological properties of the slurry are similar to those of a Newtonian liquid and substantially independent of the shear rate in the range from 2 s$^{-1}$ to 34 s$^{-1}$.

FIG. 4 illustrates the dynamic viscosity at a shear rate of 20.4 s$^{-1}$ and the water content in the air stream as a function of the GaAs content of the slurry.

Figure 5:
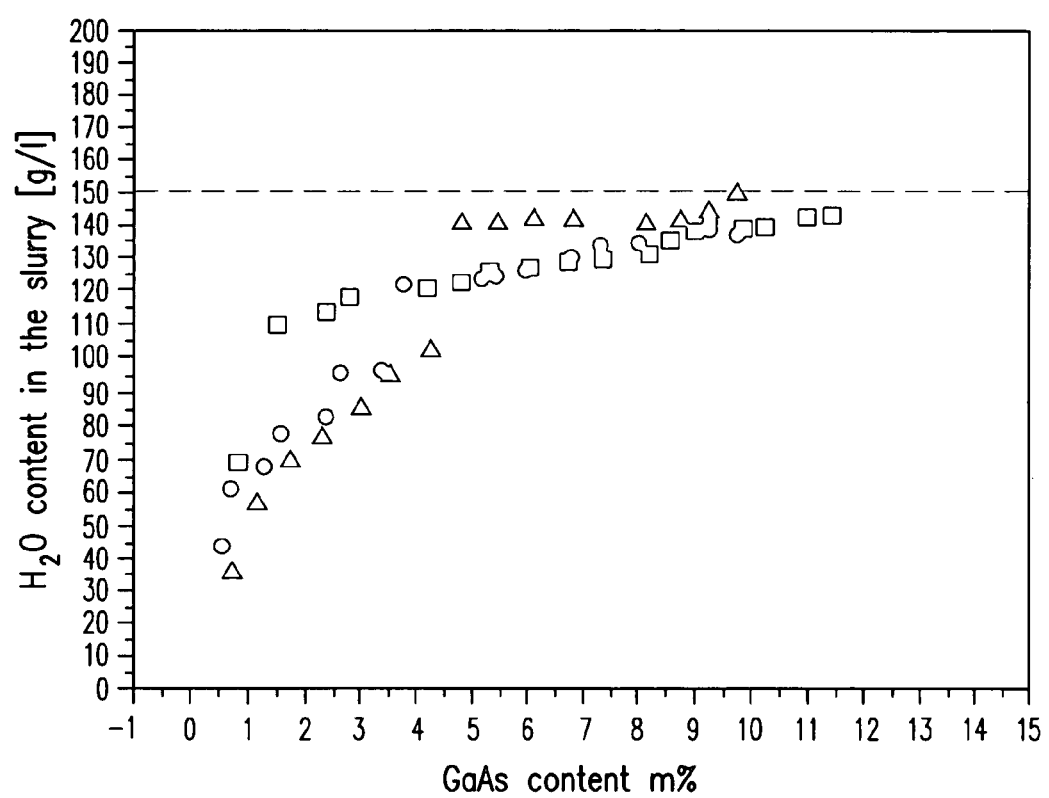
FIG. 5 is a graph showing a plot of the water content of slurries from various series of tests, in each case with an increasing duration of use of the slurry, in a process according to the first embodiment.
Figure 6:
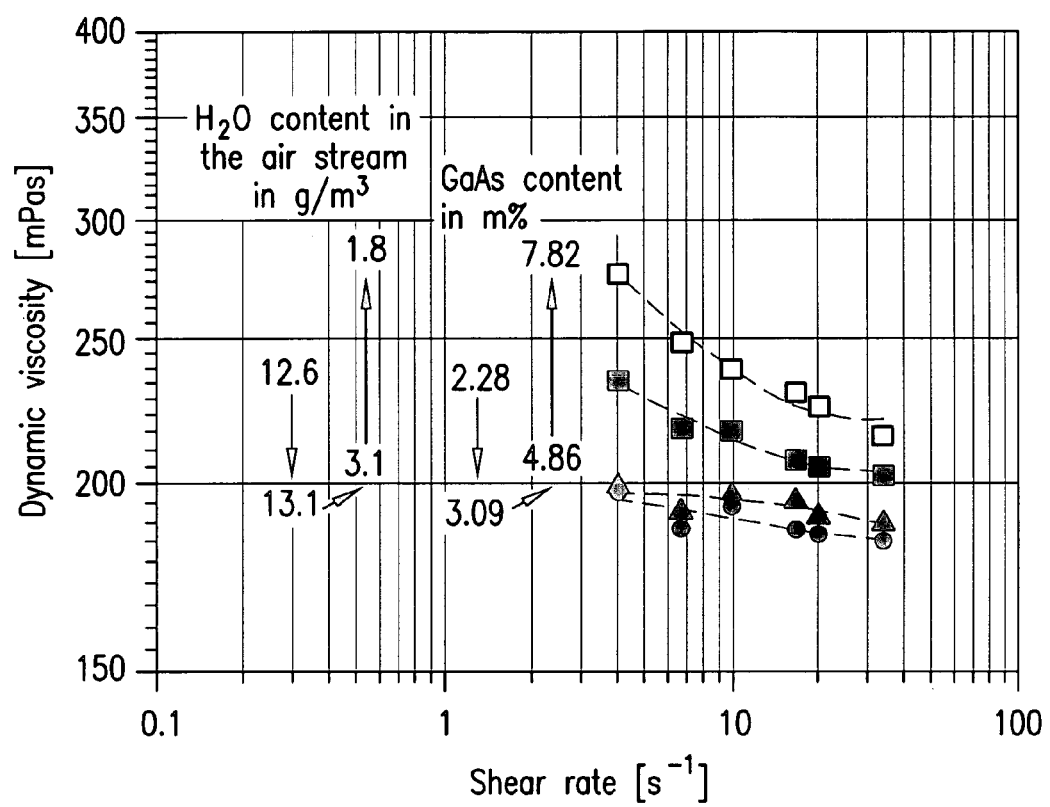
FIG. 6 is a graph showing a plot of the dynamic viscosity as a function of the shear rate for various GaAs contents of the slurry, in a process according to a second embodiment.

FIG. 5 illustrates the water content of the slurry plotted against the GaAs content for various series of tests. Each of the series of tests, which are indicated by different symbols in the graph, were carried out in accordance with the exemplary embodiment described above, without replacing the slurry. An increasing GaAs content in the slurry corresponds to an increasing duration of use of the slurry. The various series of tests differ by virtue of having different inoperative times between individual cutting processes. For each of the series of tests, the water content of the slurry rises asymptotically with an increasing GaAs content to a level of approximately 150 g/l.

The process according to the first embodiment produces uniform properties of the workpiece wafers in terms of surface roughness and wafer curvature (warp, bow) and waviness. The warp of the wafers produced in the above exemplary embodiment was measured using a Tropel Flat-Master® Interferometer. The warp of the sawn wafers, after removal of the disrupted layer by wet-chemical etching, was 10 μm or less. After sawing, no structures were obvious to the naked eye on the surface of the GaAs wafers, in particular even in the region of the edge at which the wire left the cutting gap during sawing. For example, when using the process according to the invention, it is not even obvious to the naked eye in what direction the wire moved or was oriented relative to the wafer during sawing. The surface produced in this way in the sawn state and also after the wet-chemical removal of the disrupted layer is to the naked eye indistinguishable from a surface produced by surface lapping (single-side or double-side). This difference can only be revealed using special measurement technology, such as, for example, the Tropel FlatMaster® Interferometer, which can detect inter alia the direction of movement of the wire. The surface produced using the process according to the invention is suitable for delivery for certain applications, simply after wet-chemical removal of the disrupted layer, without needing to be remachined, for example, by single-side or double-side surface lapping. For example, the wafer surfaces can be used as the back surface in the case of single-side polished wafers, or for LPE (Liquid Phase Epitaxy) applications.

The maximum roughness $R_{max}$ of these surfaces determined according to DIN 4768 over the entire wafer, in particular including in the region of the edge at which the wire leaves the cutting gap, is 10 µm or less, with a total measurement length of $l_m$=15 mm and a limit wavelength in a high-pass filtering of $\lambda$=0.8 mm. Even at a limit wavelength with a high-pass filtering of $\lambda$=2.5 mm, the roughness of the surface is 10 µm or less with otherwise identical measurement parameters. The roughness was measured perpendicular to the wire direction using a roughness measuring unit Perthometer S5P produced by Mahr, using the RFHTB-50 probe. With this roughness, the surfaces are suitable, for example, for LPE applications.

At the same time, the process produces a high running time stability for the cutting process. The slurry only has to be replaced after a large number of cutting processes, with the result that the Ga balance during recovery of Ga from the used slurry can be improved.

A process according to a second embodiment differs from the process according to the first embodiment by virtue of the fact that the water content of the air circulating within the wire saw is selectively varied over the duration of use of the slurry. By selectively changing the water content in the air stream during the duration of use of the slurry, it is possible to adapt the properties of the slurry to different parameters which change over the course of time.

One specific exemplary embodiment for the process according to a second embodiment will be described with reference to FIGS. 6 to 9. GaAs single crystals with a diameter of 150 mm were cut, as above. The slurry used was a suspension of the abrasive hard material "SiC Fujimi GC 1000" (produced by Fujimi) in the carrier substance "Pluriol E 200" (produced by BASF AG) with a mass ratio of $m_{SiC}/m_{Pluriol}$=0.8±0.2. The same parameters for pressure, temperature, air throughput and slurry throughput in the wire saw, velocity of the wire and feed rate were used as for the above-described exemplary configuration of a first embodiment of a process. The GaAs single crystals were oriented in the wire saw in the same way as above, in accordance with the methods described in DE 100 52 154 A1 and DE 101 28 630 A1.

As can be seen below in FIG. 7, the water content in the air stream is controlled to a predetermined desired value curve S which is dependent on the duration of use, i.e., the GaAs content, of the slurry. The water content of the air stream was controlled to a value of (13±2) g/m³ up to a GaAs content of 4% by mass (solid squares and circles in FIG. 6). It can be seen from FIG. 6 that the viscosity of the slurry, as in the exemplary configuration of the first embodiment of the process, drops into the asymptotic range, which is independent of the shear rate in the range of from 2 s$^{-1}$ to 34 s$^{-1}$, of (190±20) mPas as the GaAs content rises. After a GaAs content of 4.0% by mass has been reached, the water content in the air stream is controlled to (2.5±1.0) g/m³ (solid triangles and open squares in FIG. 6). The viscosity of the slurry rises again, and at the same time the viscosity again becomes dependent on the shear rate, i.e., the behavior of the slurry becomes non-Newtonian.

Figure 7:
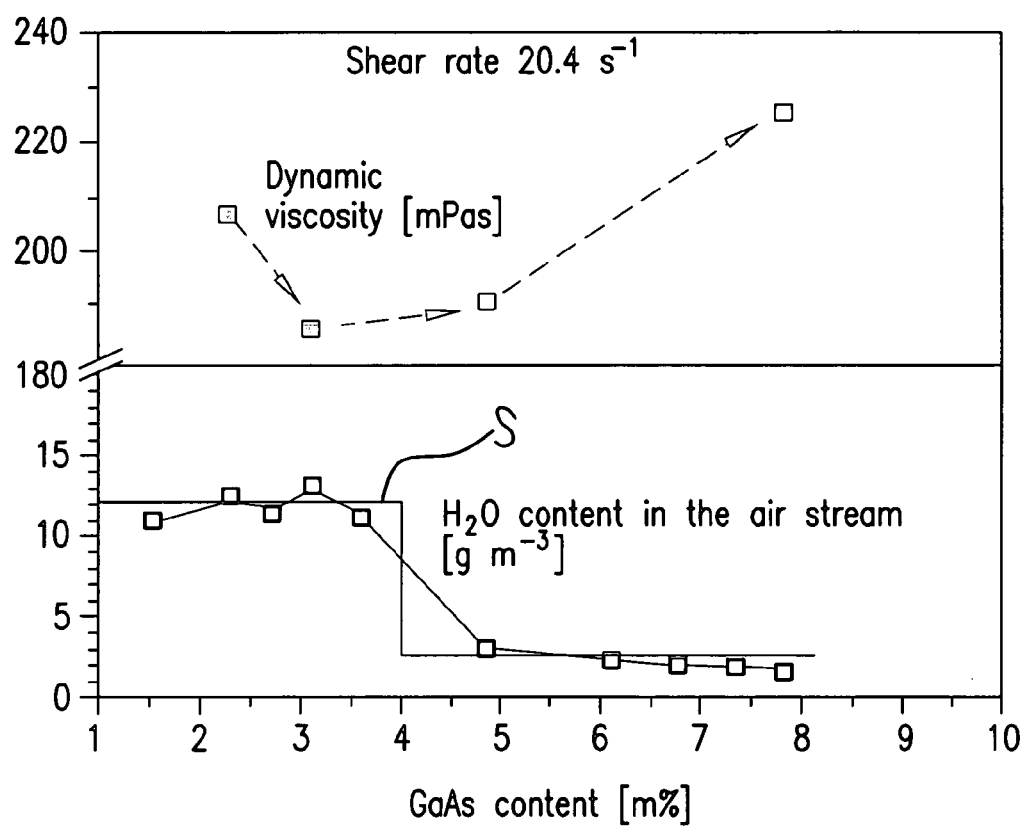
FIG. 7 is a graph showing a plot of the dynamic viscosity of the slurry at a shear rate of $20.4\ s^{-1}$ and also of the water content in the air stream, as a function of the GaAs content of the slurry, in a process according to the second embodiment.

The dynamic viscosity of the slurry at a shear rate of 20.4 s$^{-1}$ and the water content in the air stream are plotted against the GaAs content in FIG. 7. This figure once again clearly reveals how the dynamic viscosity, with a high water content in the air stream, decreases with an increasing duration of use, i.e., with an increasing GaAs content, and with a low water content in the air stream, increases again with increasing duration of use.

Figure 8:
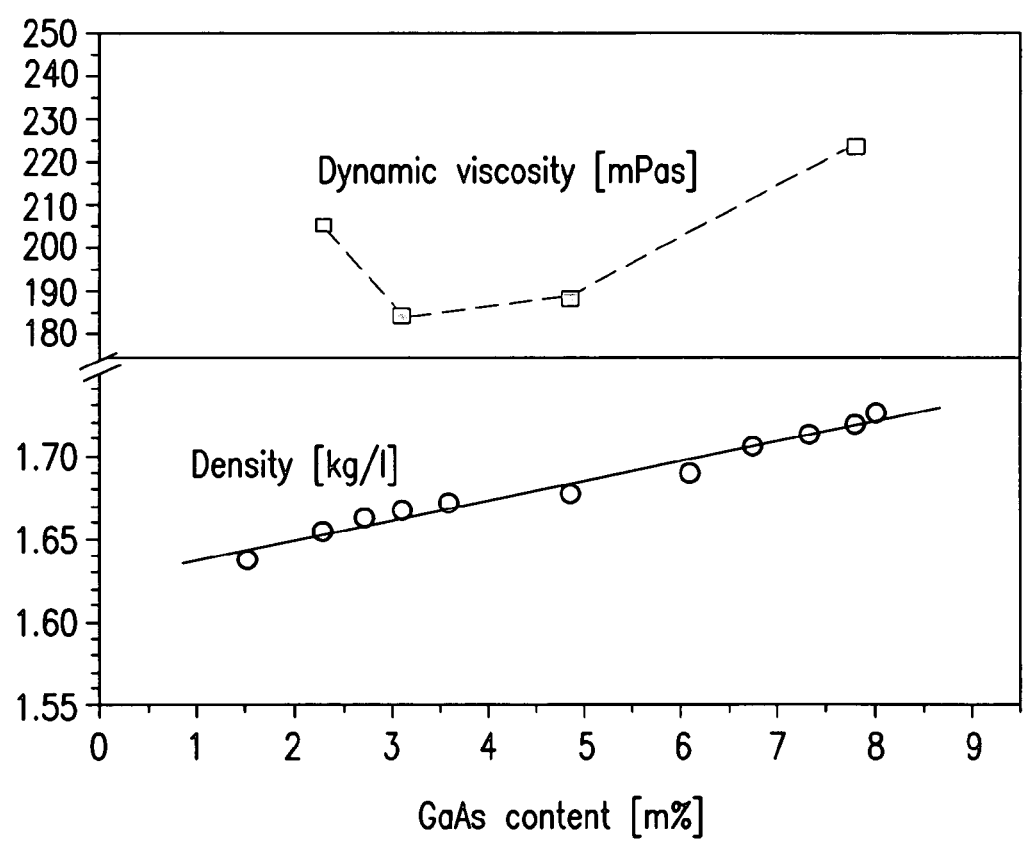
FIG. 8 is a graph showing a plot of the dynamic viscosity of the slurry at a shear rate of $20.4\ s^{-1}$ and also of the density of the slurry for various GaAs contents, in a process according to the second embodiment.

The dynamic viscosity and the density of the slurry are plotted against the GaAs content in FIG. 8. It can be seen from FIG. 8 that the dynamic viscosity of the slurry can be set independently of the density of the slurry by the second embodiment of the process.

Figure 9:
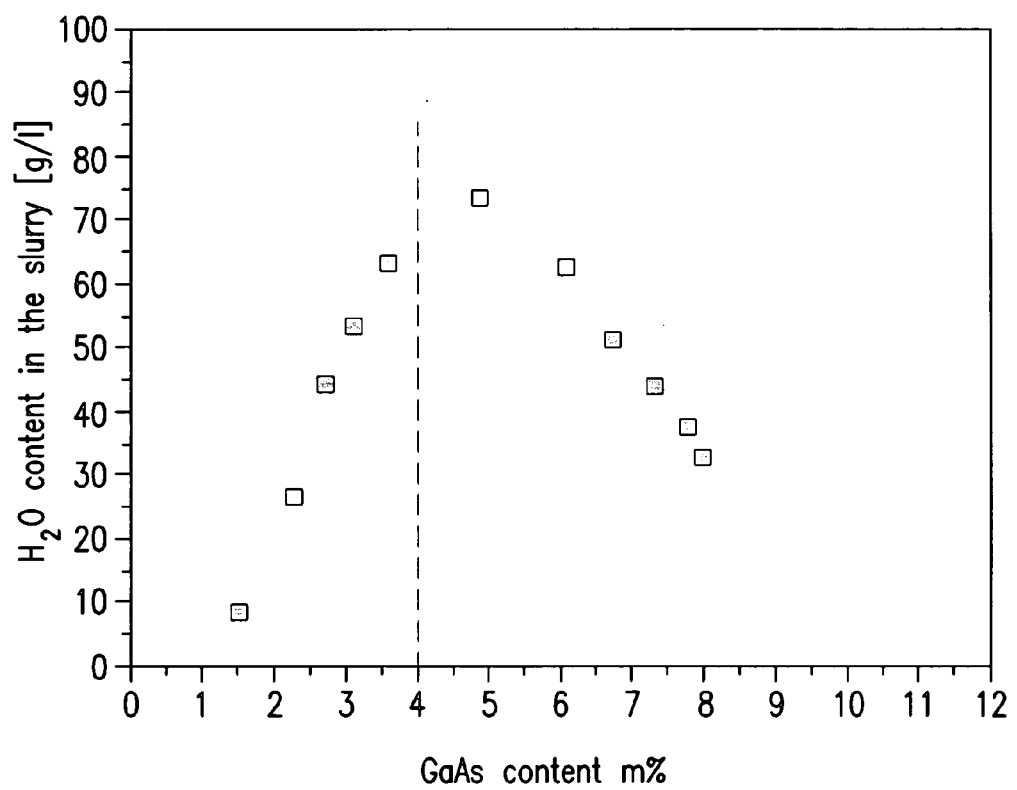
FIG. 9 is a graph showing a plot of the water content of the slurry as a function of the GaAs content, in a process according to the second embodiment.

The water content of the slurry is plotted against the GaAs content in FIG. 9. It is clearly apparent that the water content increases continuously below a GaAs content of 4% by mass and decreases again above the GaAs content of 4% by mass, after the water content of the air stream within the wire saw has been reduced from (13±2) g/m³ to (2.5±1.0) g/m³, as described above.

The second embodiment of the process can be used to compensate for fluctuations in the wire properties, so that even if the wire properties change, the surface quality of the wafers cut from the workpiece remains constant. It is thus possible to avoid the need for frequent wire changes or for the slurry to be replaced in the event of a wire change.

Figure 10:
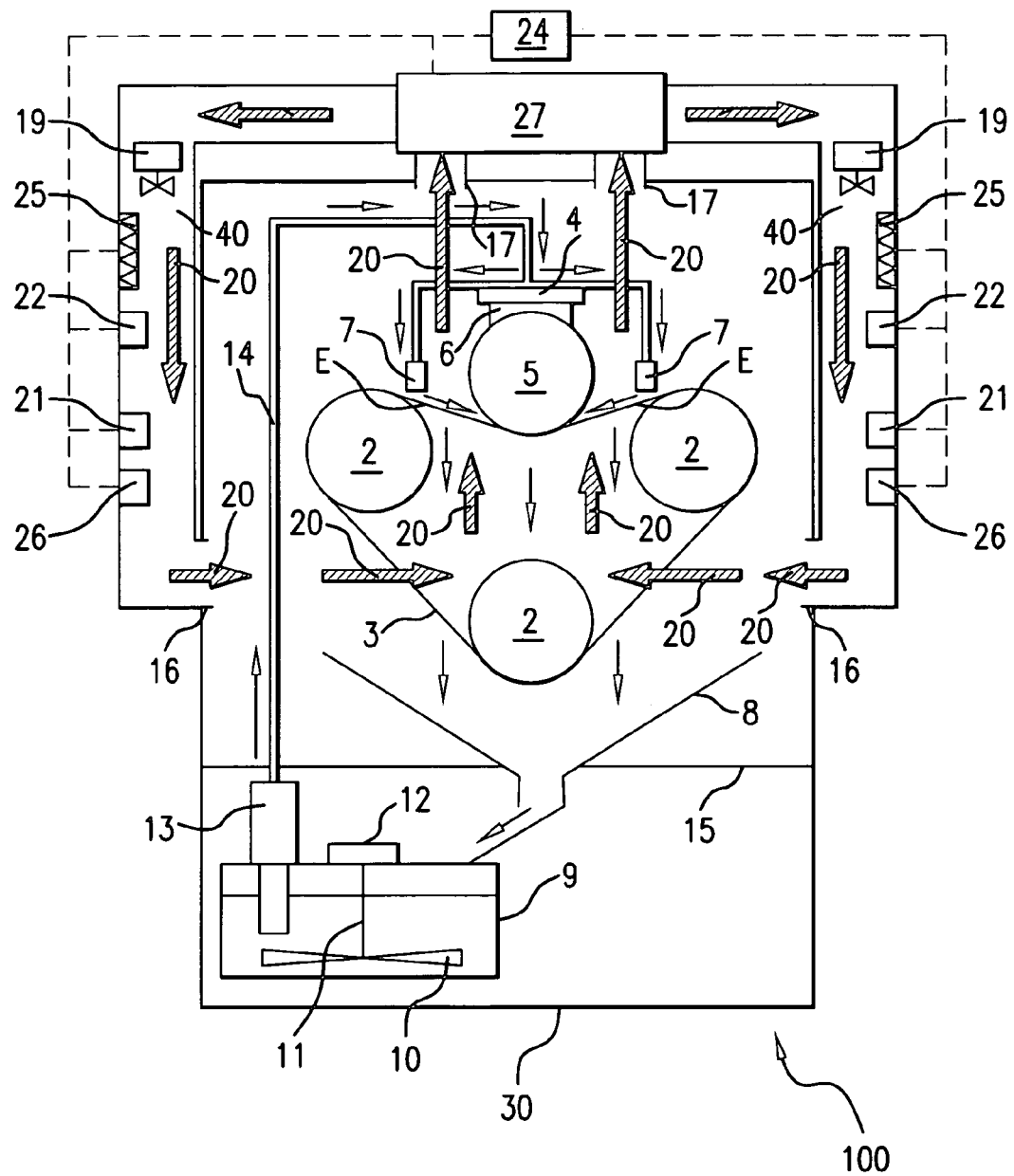
FIG. 10 is a schematic drawing showing a second exemplary embodiment of a wire saw according to the invention.
Figure 11:
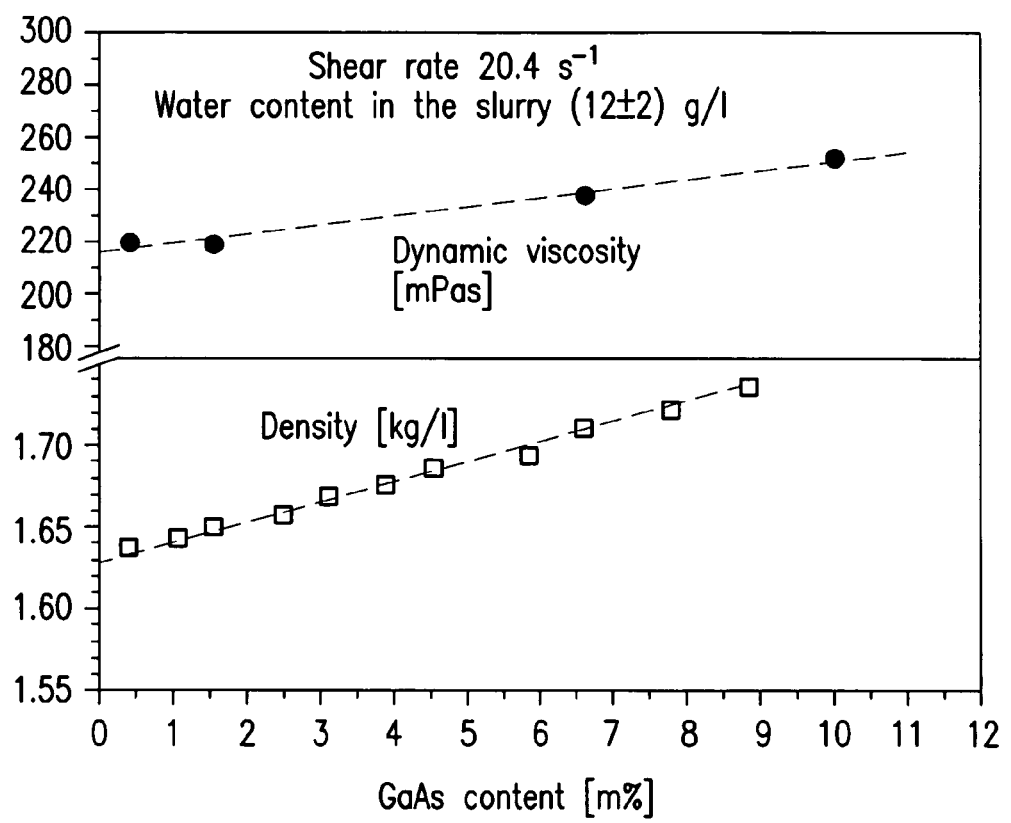
FIG. 11 is a graph showing a plot of the dynamic viscosity at a shear rate of $20.4\ s^{-1}$ and also of the density of the slurry as a function of the GaAs content in a first Comparison process known to the assignee of the present application.
Figure 12:
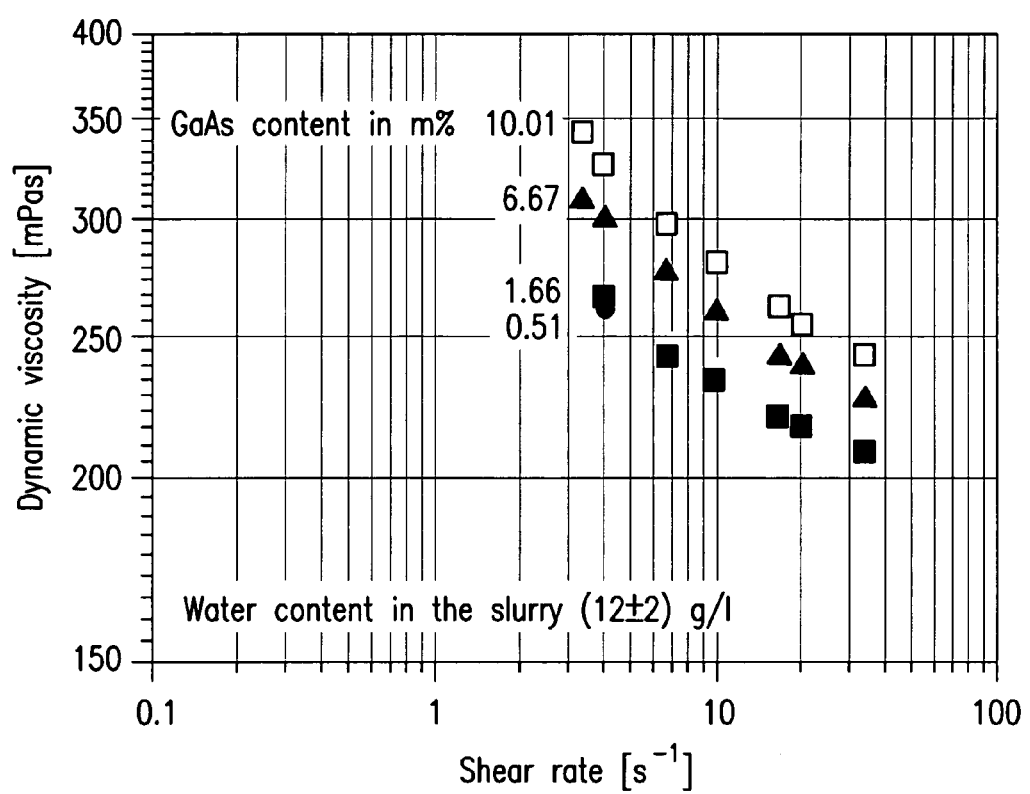
FIG. 12 is a graph showing a plot of the dynamic viscosity of the slurry as a function of the shear rate for various GaAs contents, in the first Comparison process known to the assignee of this application.
Figure 13:
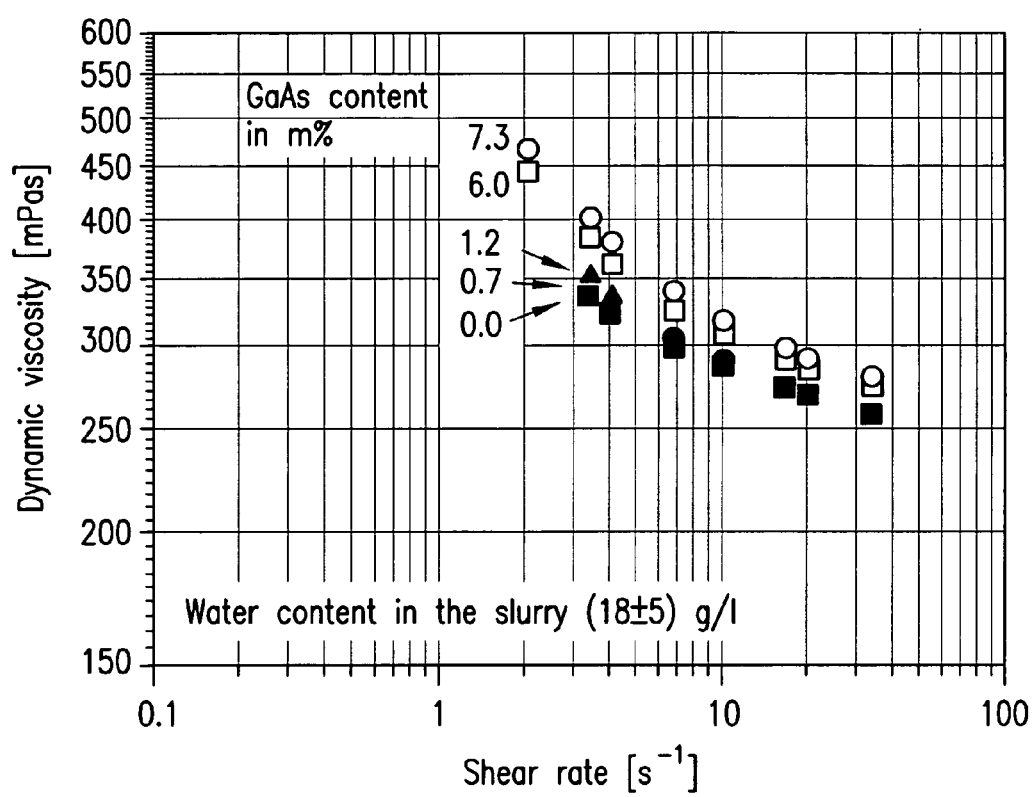
FIG. 13 is a graph showing a plot of the dynamic viscosity of another slurry as a function of the shear rate for various GaAs contents, in a second Comparison process known to the assignee of this application.

FIG. 10 illustrates a wire saw 100 in accordance with a second exemplary embodiment of a wire saw according to the invention. In FIG. 10, elements which are the same as those of the wire saw in accordance with the first exemplary embodiment shown in FIG. 1 are denoted by the same reference designations, and the description of these elements is not repeated here.

The wire saw 100 in accordance with the second exemplary embodiment differs from the wire saw 1 in accordance with the first exemplary embodiment by the fact that the circulating air stream is separated from the slurry tank. The slurry tank 9 is located in a housing 30 which is closed off in a substantially airtight manner with respect to the outer space of the wire saw. The circulating air stream 20 is passed from the air outlet openings 17 to the air inlet openings 16 through air circulating passages 40.

In the wire saw in accordance with the second exemplary embodiment, the air circulation passages 40 are not open toward the storage vessel 9. Therefore, the water content of the air in the housing 30 is independent of that of the circulating air stream 20. As a result, the exchange of water between the circulating air stream and the circulating slurry can be concentrated on the cutting region. The targeted exchange of water can be carried out particularly successfully in the cutting region, since there is a large interface between air and slurry available on the wire plane and in the cutting gap.

Modifications to the examples and embodiments described are possible.

The circulating air stream in the wire saw has been described in such a way that the air stream is passed from the bottom upward through the wire field E in the cutting region. A reverse direction of circulation, in which the air is moved from the top downward through the wire plane in the cutting region, is also possible. Any other direction is also possible, e.g., laterally or obliquely.

In the first exemplary embodiment and the second exemplary embodiment of the wire saw, the exchange of water between the air stream and the slurry takes place in the cutting region. However, while exchange of water in the cutting region is preferred in most modes of operation, it is not necessary according to the invention. The exchange of water may in addition or alternately take place at any other location at which the air comes into contact with the slurry. For example, it is possible to provide a dedicated water exchange device in the supply line 14, i.e., in place of or in addition to the arrangements described above.

The first exemplary embodiment and the second exemplary embodiment of the wire saw have been described with a specific arrangement of the air inlets 16 and air outlets 17. A different arrangement of the air inlets and air outlets for guiding the air stream within the wire saw is also possible. A different arrangement of the air humidity sensors, the temperature sensors, the fans 19, the heating device 25 and the air humidifier 22 is likewise possible, provided only that the temperature and water content of the air stream within or associated with the wire saw can be controlled.

The exemplary embodiments of the wire saw according to the invention have been described with an air dryer and an air humidifier. However, an air dryer alone or alternatively an air humidifier alone may be sufficient to control the water content of the air to a predetermined water content, depending on the temperature and initial water content of the air in the wire saw, the water content of the slurry and the water content of the air which is to be set.

The apparatus and the processes have been described with a circulating air stream within the wire saw. However, it is also possible for the wire saw to be provided without a circulating air stream, providing that the water content of a gaseous medium which comes into contact with the slurry can be controlled.

It is also possible to provide a device for drawing in air from the environment surrounding the wire saw to be provided instead of the closed air circulation in a wire saw and to control the water content and temperature of the air which is drawn in. If the water content of the air which is drawn in is above the desired water content, the water content of the air in the wire saw can be controlled using just an air dryer, without the need for an air humidifier. Conversely, if the water content of the air which is drawn in is below the desired water content, an air humidifier but no air dryer is required.

In the case of a wire saw which draws in air from the environment, it is also possible for the temperature and water content to be controlled outside the wire saw. Accordingly, in this case, the temperature sensor, the heating device, the air humidity sensor, the air dryer and/or the air humidifier may also, in each case, be arranged outside the wire saw.

Carrier substances bearing the product names "Pluriol E 200" produced by BASF AG and "Betronol MF V 1016" produced by MKU Chemie GmbH have been described as preferred carrier substances for the slurry. However, it is also conceivable to use any other carrier substance which has the ability to exchange water with a gaseous medium, i.e., all hygroscopic liquids which can take up water and release it again. By way of example, it is also possible to use "Pluriol E300" produced by BASF AF, a higher-molecular variant of the "Pluriol E200" described as the carrier substance in the examples.

The preferred abrasive hard material in the slurry in the examples was SiC bearing the product name "SiC Fujimi GC 1000" produced by Fujimi. It is also possible to use a different hard material having an abrasive action, such as, for example, hard materials made from aluminum oxide ($Al_2O_3$), cubic boron nitride (cBN), boron carbide or diamond.

The exemplary embodiments described above employed an air stream circulating within the wire saw. However, it is also possible to use a different gaseous medium, such as, for example, nitrogen, instead of air.

The process according to the invention was described, by way of example only, with a defined temperature of the air within the wire saw, a defined throughput of slurry and air within the wire saw, a defined feed rate and a defined velocity of the wire. It is possible to select a wide range of other values for these parameters, within the scope of the present invention.

The exemplary arrangement of the second embodiment of the process was described on the basis of the water content in the air stream being controlled according to a desired or predetermined value curve. However, it is also possible to control the water content in the air stream as a function of at least one parameter, preferably a measured parameter. Exemplary parameters include the formation of marks on the wafer, the viscosity of the slurry or the density of the slurry.

The process according to the invention was described for cutting GaAs single crystals. However, it can also be applied to the cutting of workpieces made from many different kinds of material.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A wire saw for cutting a workpiece, comprising:
   a wire;
   an applicator device for applying a slurry to the wire; and
   a device for establishing a predetermined water content in at least part of a gaseous medium coming into contact with the slurry.

2. A wire saw according to claim 1, further comprising a housing which separates at least a portion of the wire saw from the environment, in such a manner that the water content of gaseous medium in this portion can be controlled independently of the water content outside this portion of the wire saw.

3. A wire saw according to claim 1, further comprising a device for moving the gaseous medium within the wire saw.

4. A wire saw according to claim 2, wherein the portion of the wire saw in which the water content of the gaseous medium is controlled includes a region in which the workpiece is cut when the wire saw is operating.

5. A wire saw according to claim 1, further comprising:
   a collection apparatus for collecting the slurry applied to the wire during operation; and
   a recirculation device for recirculating the slurry collected by the collection apparatus.

6. A wire saw according to claim 5, wherein the device for establishing the water content of at least one part the gaseous medium is arranged to control the water content in the region of the recirculation device.

7. A wire saw according to claim 1, further comprising a device for controlling the temperature of the gaseous medium in the wire saw.

8. A wire saw according to claim 1, further comprising at least one monitoring device for monitoring at least one parameter, and wherein the device for establishing the water content of the gaseous medium comprises a device for controlling the water content based on said monitored parameter.

9. A process for cutting a workpiece, comprising:
wire sawing the workpiece with a wire saw;
applying a water-containing slurry to the wire during sawing; and
establishing a predetermined water content of at least part of a gaseous medium coming into contact with the slurry during at least one stage of the process.

10. A process according to claim 9, further comprising circulating the gaseous medium within the wire saw.

11. A process according to claim 9, further comprising circulating the slurry within the wire saw.

12. A process according to claim 9, wherein the water content of the gaseous medium in a cutting region in which the workpiece is cut is controlled to a value in the range from 7–17 $g/m^3$ during at least a part of the operating time of the process.

13. A process according to claim 9, wherein the water content of the gaseous medium in a cutting region in which the workpiece is cut is controlled to a value in the range from 11–15 $g/m^3$ during at least a part of the operating time of the process.

14. A process according to claim 9, wherein the water content of the gaseous medium in a cutting region in which the workpiece is cut is controlled to a value of less than approximately 5 $g/m^3$ during at least a part of the operating time of the process.

15. A process according to claim 9, in which the water content of the gaseous medium is controlled variably as a function of at least one measured parameter of the process.

16. A process according to claim 15, wherein the measured parameter comprises the density and/or viscosity of the slurry.

17. A process according to claim 9, wherein the water content of the gaseous medium is kept on a predetermined desired curve, which is dependent on the duration of use of the slurry.

18. A process according to claim 9, further comprising controlling the temperature of the gaseous medium.

19. A slurry for use in a wire saw, the slurry having a dynamic viscosity of less than approximately 220 mPas, and wherein the dynamic viscosity in the shear rate range from 2 $s^{-1}$ to 34 $s^{-1}$ is substantially independent of the shear rate.

20. A slurry according to claim 19, wherein the dynamic viscosity is in the range from 170 to 200 mPas for any shear rate in the range from 2 $s^{-1}$ to 34 $s^{-1}$.

21. A slurry according to claim 19, wherein the dynamic viscosity of the slurry is substantially independent of the shear rate in the shear rate range from 1 $s^{-1}$ to 100 $s^{-1}$.

22. A slurry according to claim 19, wherein the slurry has a water content of more than 60 g/l.

23. A slurry according to claims 19, which includes a glycol-based carrier substance.

24. A process for preconditioning a slurry that comprises a hygroscopic carrier substance, comprising:
first preparing the slurry with a starting viscosity predetermined at a shear rate of 20.4 $s^{-1}$, and
preconditioning the slurry, by controlling the water content of at least part of a gaseous medium coming into contact with the slurry, for a period of time so that the slurry has a preconditioned viscosity of approximately 220 mPas or less at a shear rate of 20.4 $s^{-1}$, wherein the preconditioned viscosity differs from the starting viscosity.

25. A slurry comprising a hygroscopic carrier substance which has been produced by a process according to claim 24.

* * * * *